Figure 1:
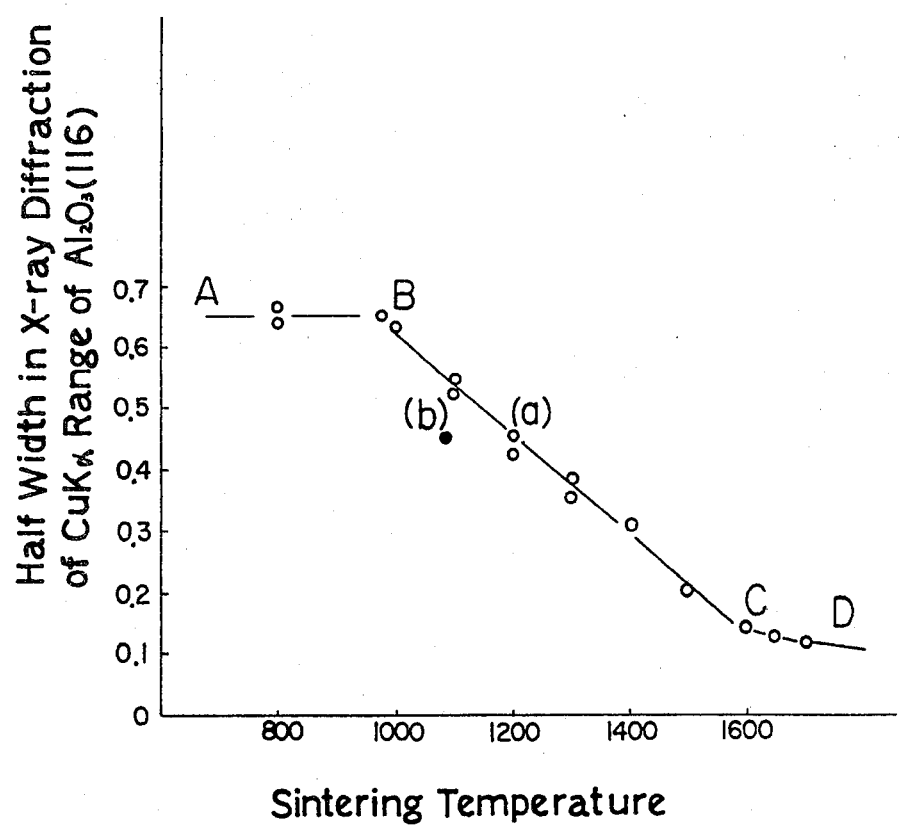

United States Patent [19]

Nakai et al.

[11] 4,389,465
[45] Jun. 21, 1983

[54] SINTERED COMPACT FOR USE IN A TOOL AND THE METHOD FOR PRODUCING THE SAME

[75] Inventors: Tetsuo Nakai; Yuichiro Kono; Shuji Yazu; Akio Hara, all of Itami, Japan

[73] Assignee: Sumitomo Electric Industries, Ltd., Osaka, Japan

[21] Appl. No.: 349,663

[22] Filed: Feb. 17, 1982

Related U.S. Application Data

[63] Continuation of Ser. No. 145,454, Apr. 25, 1980, abandoned.

[30] Foreign Application Priority Data

May 1, 1979 [JP] Japan .................................. 54-53583

[51] Int. Cl.³ ............................................ C04B 35/58
[52] U.S. Cl. .................... 428/698; 428/457; 501/98; 51/309; 264/65
[58] Field of Search ............................ 51/309; 501/98; 428/698, 457; 264/65

[56] References Cited

U.S. PATENT DOCUMENTS

| | | | |
|---|---|---|---|
| 2,888,355 | 5/1959 | Taylor | 501/96 |
| 3,151,994 | 10/1964 | Adlassing | 501/98 |
| 3,767,371 | 10/1973 | Wentorf et al. | 51/309 |
| 3,850,053 | 11/1974 | Bovenkerk | 51/309 |
| 3,852,078 | 12/1974 | Wakatsuki et al. | 501/92 |
| 3,854,967 | 12/1974 | Reinmuth | 501/98 |
| 3,944,398 | 3/1976 | Bell | 51/309 |
| 4,007,049 | 2/1977 | Rossi et al. | 501/98 |
| 4,186,022 | 1/1980 | Ordanian et al. | 501/87 |
| 4,224,380 | 9/1980 | Bovenkerk et al. | 51/309 |

*Primary Examiner*—Mark Bell
*Attorney, Agent, or Firm*—Wenderoth, Lind & Ponack

[57] ABSTRACT

The invention relates to a sintered compact for use in an ultrahard tool having high resistance to heat and wear, outstanding thermal conductivity and thermal shock resistance property at elevated temperature, and suitable for high-speed cutting, and to a method for producing the same. A powder mixture comprising 20–80 volume % high pressure form boron nitride powder, the residual part consisting of $Al_2O_3$ powder or a compound ceramic powder principally comprising $Al_2O_3$ powder and also containing carbides, nitrides of IVb, Vb, VIb metals of the periodic table, mutual solid solution thereof or admixture thereof, is sintered as it stands or after pressing under a high pressure and a high temperature so that $Al_2O_3$ of the compound ceramic constitutes a continuous phase in the structure of the sintered compact, and the half width of (116) in the X-ray diffraction of CuKα ray of $Al_2O_3$ crystals in the structure constituting the continuous phase is within the range from 0.200 deg. to 0.600 deg., thereby enabling to obtain a sintered compact for use in a tool having the aforesaid high properties.

5 Claims, 2 Drawing Figures

SINTERED COMPACT FOR USE IN A TOOL AND THE METHOD FOR PRODUCING THE SAME

This is a Continuation of application Ser. No. 145,454 filed Apr. 25, 1980, now abandoned.

The invention relates to a sintered compact for use in an ultrahard tool and a method for producing the same.

High pressure form boron nitride has high hardness, outstanding thermal conductivity and small reactivity to iron group metals at elevated temperature. Thus, the sintered compact thereof is now attracting attention as one of the best materials for a cutting tool.

The inventors concerned have made various researches on sintered compacts for use in cutting tools which are capable of displaying the maximum of the outstanding properties of high pressure form boron nitride.

A first accomplishment was a sintered compact in which carbides, nitrides, borides, silicides of IVb, Vb, and VIb transition metals of the periodic table or a mutual solid solution compound thereof constituted a continuous phase bonding cubic boron nitride crystals belonging to high pressure form boron nitride, (hereinafter abbreviated as CBN). Thus, the inventors concerned provided a sintered compact for use in an ultrahard cutting tool having high resistance to heat and wear and capable of maintaining high thermal conductivity and particularly thermal shock resistance property at elevated temperatures.

The inventors concerned subjected the said sintered compact to various cutting tests. As a result, it was found that CBN was highly distinguished material for its resistance to adhesion even in low-speed cutting where high-speed steel was used. Based on this discovery, the inventors concerned proposed a sintered compact for use in an ultrahard cutting tool in which $Al_2O_3$, AlN, SiC, $Si_3N_4$, $B_4C$, an admixture thereof or a mutual compound thereof constitutes a continuous phase bonding CBN crystals.

The sintered compact based on this second proposition was put to various cutting tests. As a result, it has been found that the said sintered compact shows by far the highest properties particularly in the finishing of cast iron, hence the present application.

Generally, cast iron is cut mostly by a cemented carbide tool of Series K under JIS classification at a cutting speed of about 70-150 m/min, whilst by a ceramic tool principally comprising $Al_2O_3$ at a cutting speed of 300-600 m/min.

In most cases, cast iron has graphite precipitated thereinside unlike general steel material. Since its structure is not uniform, so to speak, the machined surface is less smooth compared with that of steel. This poses a serious problem particularly in the case of finishing. Thus, there has been a strong demand for a tool enabling to obtain a better surface finish.

In addition, though needless to mention, most of the cast iron parts are structures of various shapes, for example, cases and the like. Since they have many thin portions, it is difficult to maintain dimensional precision due to deformation or warp during the cutting. This poses another problem in the finishing.

When viewed from the aforementioned aspects, the conventional tools had their defects in the following respects.

If a cemented carbide tool was used, it was difficult to obtain a good surface finish. Moreover, the tool was readily worn and useless if operated at a speed on the order of 300-600 m/min. Though a ceramic tool principally comprising $Al_2O_3$ permitted high-speed cutting with fairly satisfactory surface finish, it was not suitable for finishing because of unstability of dimensional precision of the processed product. When it was used out of necessity, an additional process, such as horning and the like, had to be supplemented after the cutting.

It has been found that the sintered compact according to the invention can cut cast iron with better surface finish than the conventional tool, is capable of standing a high-speed cutting on the order of 300-600 m/min, and enables to obtain high dimensional precision in the processing of thin members.

Such smoother surface finish has been anticipatable from the fact that both high pressure form boron nitride and $Al_2O_3$ principally constituting the sintered compact according to the invention have high resistance to adhesion. The possibility of high-speed cutting has also been anticipatable from the fact that both high pressure form boron nitride and $Al_2O_3$ are stable at high temperatures and $Al_2O_3$ is known to produce a glassy film of a low fusing point, so-called Belag, together with Fe, Si, etc. in the material to be cut thereby protecting the tool. The reason of dimensional precision can not be readily explained. However, as a result of a close examination of the edge of the tool after the cutting, the inventors concerned have reached a tentative conclusion as follows.

The conventional ceramic tool principally comprising $Al_2O_3$ has its edge slightly deformed apart from the wear thereof, the edge being blunted of its original sharpness and relatively rounded. On the other hand, the edge of the sintered compact according to the invention retains its sharpness though worn. Presumably, the ceramic tool principally comprising $Al_2O_3$ is unable to process with precision due to a reduction of sharpness and an increase in cutting resistance resulting from blunting of the edge.

It is presumable that the blunting of the edge of the $Al_2O_3$ ceramic tool is due to plastic deformation at high temperatures during the cutting, whilst the sintered compact according to the invention is free from such deformation since it principally comprises high pressure form boron nitride having high temperature strength.

The inventors concerned have made a closer examination of a sintered compact comprising CBN and $Al_2O_3$ based on the said second proposition. As a result, it has been found that the properties of the tool are greatly affected not only by the content of CBN and $Al_2O_3$ in the sintered compact but also by the half width in X-ray diffraction of $CuK\alpha$ ray of $Al_2O_3$ (116) in the sintered compact. This will be described in detail in reference to the accompanying drawings.

FIG. 1 shows the interrelation between the sintering temperature and the half width in X-ray diffraction of $CuK\alpha$ ray of $Al_2O_3$ (116) of the CBN-$Al_2O_3$ sintered compact sintered under a pressure of 50-60 Kb. In the drawing, (a) designates a sintered compact sintered at 1200° C., and (b) designating a sintered compact sintered at 1080° C. with $Al_2O_3$ powder changed to other powder material.

Figure 2:
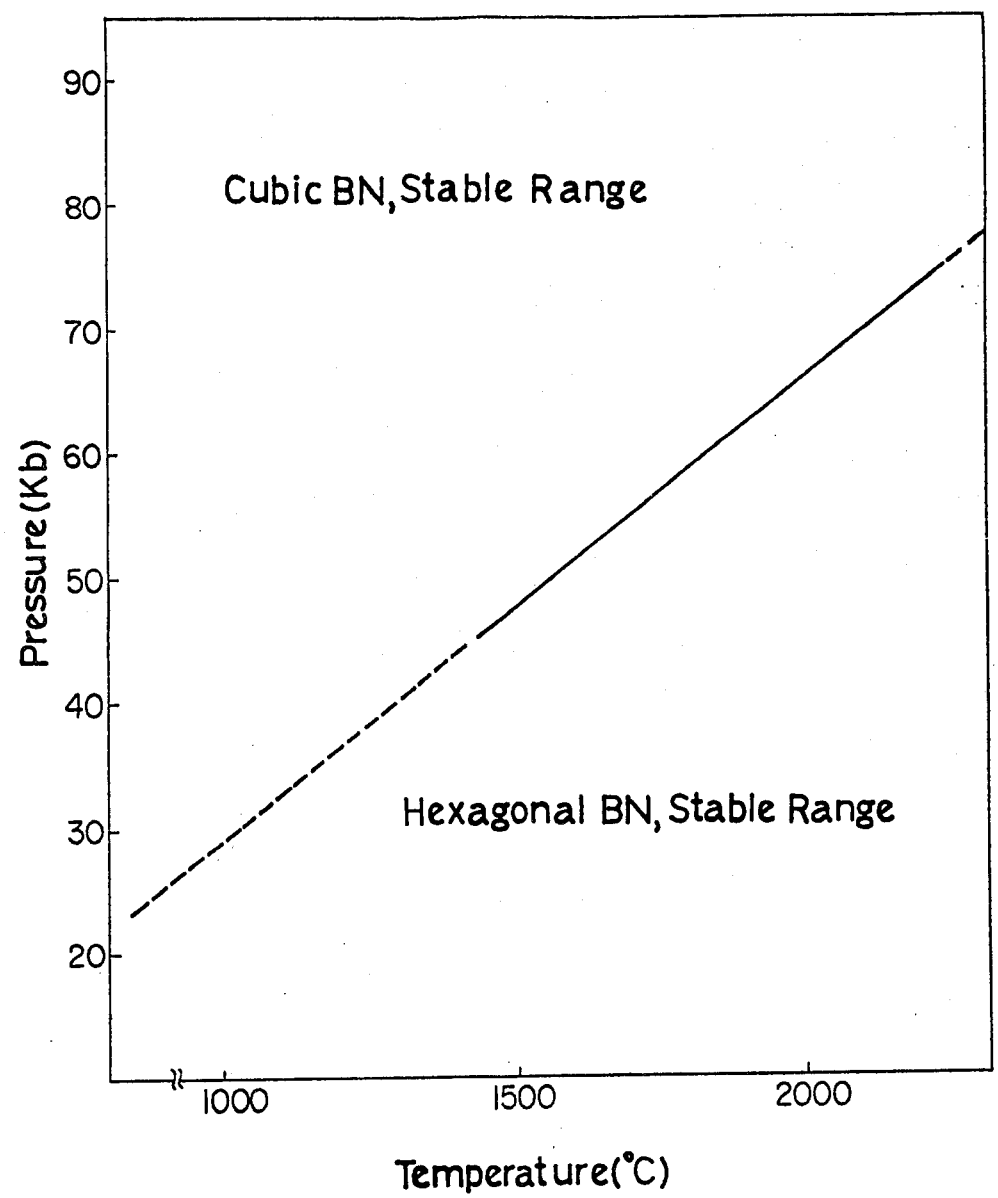

FIG. 2 relates to the production condition of the sintered compact according to the invention. It shows the range of the stabilized existence on the pressure-temperature phase diagram of CBN.

Generally, the half width of a material in X-ray diffraction depends on the particle size of its crystal, strain or the bonding state with other material.

As is shown in FIG. 1, the half width of $Al_2O_3$ (116) of CBN-$Al_2O_3$ sintered compact sintered under a pressure of 50-60 Kb, though constant up to B, reduces thereafter in accordance with the elevation of the sintering temperature. To be more precise, no reduction of the half width is observed between A and B since reaction scarcely arises between CBN and $Al_2O_3$ or between the latters, whilst it seems that between B and C the half width decreases due to development of reaction between CBN and $Al_2O_3$ or between the latters in progress of the sintering. However, when the temperature is raised beyond C, reduction of the half width is scarcely observable in spite of the reaction between CBN and $Al_2O_3$ or between the latters.

Cutting tools were produced from the sintered compacts of FIG. 1 and put to various tests. Those within the range from A to B, i.e., those having half widths on the order of 0.65 deg., were heavily worn as if the sintered compact were about to fall away in particles, and the amount of wear after a predetermined time of cutting was considerably great.

In comparison, the sintered compacts within the range from B to C, i.e., those having half widths below 0.6 deg., were less worn, and the worn surface was relatively smooth and no trace of particle falling was noticeable. However, a closer examination disclosed that the wear was increased according as the half width was reduced from 0.3 deg. to 0.2 deg. Particularly when the half width was less than 0.14 deg., the amount of wear was considerably greater compared with the case of 0.2 deg. Next, a sintered compact (b) sintered under the same pressure of 50 Kb by making use of a powder material different from $Al_2O_3$ powder though having the same half width as the sintered compact (a) of FIG. 1 was subjected to cutting tests. As a result, both the sintered compacts showed practically the same properties.

Though the interrelation between the half width and the properties of the tool is not necessarily clear, it may be explained as follows.

As described hereinbefore, in sintered compacts within the range from A to B having half widths on the order of 0.65 deg. which is unvariable by the sintering temperature, sintering scarcely proceeds between CBN and $Al_2O_3$ or between the latters. As a result, such sintered compacts appear as if falling away in particles and consequently are heavily worn. On the other hand, between B and C, the half width reduces with the progress of sintering, and practically satisfactory tool properties are obtainable when the half width is below 0.600 deg. However, since the particle growth of $Al_2O_3$ proceeds synchronously with the progress of sintering, the tool properties appear to deteriorate when the half width is reduced below 0.200 deg. It is also conceivable that reactionary products (for example, $AlB_2$, $AlBO_x$, etc) produced on CBN-$Al_2O_3$ interface are increased in conformity with the elevation of the sintering temperature, such reactionary products which are brittle causing the CBN particles to readily fall away during the cutting.

Thus, in order to permit the sintered compact according to the invention to display its properties to the fullest extent, the half width in X-ray diffraction of $CuK\alpha$ ray of $Al_2O_3$ (116) in the sintered compact should be within the range from 0.600 deg. to 0.200 deg. It is a matter of common knowledge that the properties of the sintered compact can be improved by minimizing its particles. For this purpose, it is necessary that the powder material is in very small particles. Various sintered compacts were produced by changing the particle size of CBN. As a result of test, it has been found that the tool properties are very satisfactory when the particle size of CBN is smaller than 5 $\mu$m. Cutting tests on various materials have shown that a sintered compact containing 20-55 volume % CBN shows particularly satisfactory cutting properties on cast iron.

When the sintered compact according to the invention is used as a cutting tool, it is sufficient if the edge of the tool is formed with a hard layer containing high pressure form boron nitride having high wear resistance.

Therefore, it is more advantageous from the viewpoint of economy and strength of the tool to produce a compound sintered compact in which a hard layer is bonded onto the substrate of cemented carbide. The thickness of the hard layer of the compound sintered compact should be changed in conformity with the condition of use thereof as a cutting tool and the configuration of the tool. Generally, however, if the layer has a thickness more than 0.5 mm, it will be sufficient for the sintered compact according to the invention.

The cemented carbide to be used as substrate is preferably WC base cemented carbide having high rigidity, thermal conductivity and toughness. In order to obtain such compound sintered compact substrate is preliminarily produced in a predetermined configuration from cemented carbide, a powder mixture principally comprising compound ceramic containing high pressure form boron nitride and $Al_2O_3$ or principally containing $Al_2O_3$ for forming the hard layer which is the edge of the tool being placed in contact with the said substrate either in the state of powder or after pressing, the whole being hot pressed in an ultrahigh pressure apparatus thereby enabling the hard layer to be sintered and synchronously bonded to the cemented carbide substrate.

The cemented carbide substrate contains a metal, such as Co and the like, as a bonding phase, the said bonding metal melting if the liquid phase appearance temperature thereof is exceeded during the hot pressing. If the high pressure form boron nitride content of the hard layer forming powder is greater than in the case of the sintered compact according to the invention, for example, when the powder consists of high pressure form boron nitride alone, the high pressure form boron nitride particles have very high rigidity and are not readily deformable. Thus, the particles remain spaced from each other even under ultrahigh pressure to permit the aforesaid liquid phase of the cemented carbide substrate to infiltrate thereinto. In the case of the sintered compact according to the invention, high pressure form boron nitride is bonded by $Al_2O_3$ compound ceramic principally comprising $Al_2O_3$ and containing carbides, nitrides, carbonitrides of IVb, Vb, and VIb metals of the periodic table or aluminum nitride (AlN), such bonding material forming a continuous bonding phase in the sintered compact. Since $Al_2O_3$ and compound ceramic have less rigidity than that of high pressure form boron nitride, they are deformed under ultrahigh pressure and have been turned into a pressure powder body leaving practically no spacing therein prior to the appearance of liquid phase in the cemented carbide substrate. Thus, in the case of the sintered compact according to the invention, there arises no such phenomenon that a liquid phase produced in the cemented carbide substrate during the hot pressing under ultrahigh pressure infiltrates into the hard layer thereby varying the structure of the hard layer of reducing the wear resistance thereof.

In order to produce a compound sintered compact of high pressure form boron nitride and $Al_2O_3$ or compound ceramic principally comprising $Al_2O_3$, high pressure form boron nitride powder and $Al_2O_3$ powder or powder of compound ceramic principally comprising $Al_2O_3$ are mixed by means of a ball mill or the like, the powder mixture as it stands or after pressing into a predetermined configuration under normal temperature being sintered under high pressure and high temperature in an ultrahigh pressure apparatus. The ultrahigh pressure apparatus comprises the girdle type, belt type and the like for use in synthesizing diamond.

A graphite tube is used as a heater, into which is plugged an insulator, such as talc, NaCl, etc., so as to envelop the high pressure form boron nitride powder mixture. Around the graphite heater there is placed a pressure medium, such as pyrophelite and the like. The sintering pressure and temperature are preferably maintained within the stable range of cubic boron nitride as shown in FIG. 2. The said stable range, however, is shown simply as a standard, since the exact equilibrium lines are not necessarily precisely known. In FIG. 2, (A) shows the stable range of cubic boron nitride, whilst (B) shows the stable range of hexagonal boron nitride, respectively. The feature which characterizes the sintered compact according to the invention and makes the invention useful consists in that the heat resisting compound of $Al_2O_3$ or compound ceramic principally comprising $Al_2O_3$ constitutes a continuous phase on the structure of the sintered compact.

To be more precise, in the sintered compact according to the invention a tenacious heat resisting compound assumes an aspect of continuous bonding phase by flowing in between the ultrahard high pressure form boron nitride particles as if it were a metal Co phase which is the bonding phase in WC-Co cemented carbide, thereby imparting toughness to the sintered compact. In order to obtain a sintered compact having such structure, experiments have shown that it is necessary to determine the high pressure form boron nitride content below 80% by volume. The lower limit of the high pressure form boron nitride content of the sintered compact according to the invention is 20% by volume. If the high pressure form boron nitride content is less than the said limit, it will be impossible to expect the high pressure form boron nitride properties from the tool. Particularly in cast iron cutting, the sintered compact containing 20–55 volume % high pressure form boron nitride shows very high cutting properties.

Particularly when the sintered compact is for use in a cutting tool, the size of the crystal particle is preferably less than several $\mu m$. Fine powder of several $\mu m$ or below a $\mu m$ contains oxygen in large amount. Generally, most of the said oxygen is present on the surface of the powder in the form of a compound more or less similar to a hydroxide. The said compound similar to a hydroxide is dissolved when heated and discharged as a gas. The gas can easily be discharged from the system when the material to be sintered is not sealed. However, when the material is sintered under ultrahigh pressure as is the case with the invention, it is almost impossible for the gas to escape out of the heating system. It is common knowledge in powder metallurgy that a preliminary degassing treatment is effected in such case. However, when the degassing temperature can not be sufficiently elevated, there arises a difficult problem, and the invention is precisely a case in point. In other words, when possible transformation of high pressure form boron nitride into low pressure form is taken into account, the heating temperature has its upper limit.

The powder is degassed according to the following steps. First, physically adsorbed gas and moisture are removed at low temperatures, then chemically adsorbed gas and hydroxides being dissolved, oxides remaining lastly. Since high pressure form boron nitride is stable up to about 1100° C., they can be preheated up to the said level at the least. Therefore, if preliminarily degassed by heating, the residual gas component may be left in the form of an oxide. To render it reversely, since it is desirable that as little gas component as possible should remain in the sintered compact, it is preferable that moisture and hydrogen are completely removed in the preliminary treatment. Based on this conception, all the degassing treatment is effected at a temperature below 1100° C. in a vacuum according to the invention.

In the sintered compact according to the invention, $Al_2O_3$ or a heat resisting compound principally comprising $Al_2O_3$ is used as a binder of high pressure form boron nitride. Furthermore, it may also contain a metal phase, such as Mo, W, Ti, Ni, Co, Fe, etc., as a third phase in addition to the heat resisting compound. However, the principal component of the bonding phase is the heat resisting compound phase principally comprising $Al_2O_3$, and the said metal phase should be less than the heat resisting compound phase in volume percentage. If the content of the metal phase exceeds that of the compound phase, the sintered compact has its resistance to heat and wear impaired and can no longer display its properties as a tool. In addition, the sintered compact according to the invention may contain as an additive such element as is used for synthesizing high pressure form boron nitride and believed to have solubility to hexagonal boron nitride, high pressure form boron nitride under high pressure, for example, alkali metals, such as Li, etc., alkaline earth metals, such as Mg, etc., P, Sn, Sb, Al, Cd, Si, aforesaid compound such as MgO, AlN and the like.

The high pressure form boron nitride used as material of the sintered compact according to the invention are synthesized from hexagonal boron nitride under ultrahigh pressure. Thus, there is possibility of hexagonal boron nitride being left as an impurity in the powders of high pressure form boron nitride. Furthermore, since the particles of high pressure form boron nitride is not subjected to hydrostatic pressure until the bonding material flows in between each said particles when sintered under ultrahigh pressure, there is possibility that adverse transformation into hexagonal boron nitride may arise as a result of heating. If the aforesaid element having a catalystic effect on hexagonal boron nitride is added to the powder mixture, the reverse transformation may effectively be precluded.

The sintered compact according to the invention with its high hardness, toughness and resistance to heat and wear is also suitable for various tools, such as wire drawing dies, skinning dies, drill bits and the like, to say nothing of the cutting tools.

Examples of the invention will hereinunder be described in detail.

The material in the examples is all cubic boron nitride. However, practically the same result is obtainable if CBN is replaced by wurtzite boron nitride (WBN), an admixture of CBN and WBN or CBN partly replaced by diamond.

EXAMPLE 1

CBN powder having a mean particle size of 7 μm and Al$_2$O$_3$ powder having a mean particle size of 1 μm were blended in the ratio of 60% to 40% by volume, and fully mixed in a mortar. The powder mixture with 2% camphor added thereto was pressed into a sample 10 mm in outside diameter and 1.5 mm in height. The sample was placed in a container made of stainless steel. The container was degassed by heating it in a vacuum furnace under a vacuum of $10^{-4}$ Torr and at a temperature of 1100° C. for 20 minutes. Then, the container was placed in a girdle type ultrahigh pressure apparatus. Pyrophelite was used as a pressure medium, whilst a graphite tube as a heater. NaCl was plugged between the graphite heater and the sample. The pressure was raised to 55 Kb and then the temperature was elevated to 1400° C. After maintaining it for 30 minutes, the temperature was lowered and the pressure was slowly reduced. The sintered compact thus obtained was about 10 mm in outside diameter and about 1 mm in thickness. The sintered compact was ground into a plane by a diamond grinder and then polished by means of diamond paste.

A microscopic observation of the polished surface revealed that the sintered compact was of a completely compact structure with Al$_2$O$_3$ flowing in between CBN particles. The hardness of the sintered compact was measured by a microvickers hardness tester. The mean value thereof was 3200. The sintered compact was cut by means of a diamond cutter to produce a cutting chip. The cutting chip was welded to a steel substrate.

By way of comparison, a cutting tool of the same configuration was produced from cemented carbide K10 under JIS classification. Cutting tests were made on FC20 cast iron having a hardness of H$_{RB}$220 under the following conditions: cutting speed 100 m/min; depth of cut 0.2 mm; feed 0.1 mm/rev. As a result, the surface roughness by K10 was 15 μm R$_{MAX}$, whilst that by the sintered compact according to the invention was 6 μm R$_{MAX}$, which was slightly deteriorated to 7 μm after cutting for 100 minutes. An observation of the edge of the tool after the cutting showed that there was tough adhesive on the rake of the K10 tool, whilst no such adhesive was observable in the case of the sintered compact according to the invention.

EXAMPLE 2

CBN powder and ceramic powder were mixed in conformity with the compositions shown in Table 1. The CBN powder had a mean particle size of 4 μm.

TABLE 1

| No. | CBN Vol % | Binder | Binder Vol % | Pressure Kb | Temperature °C. |
|---|---|---|---|---|---|
| A | 75 | Al$_2$O$_3$ | 25 | 60 | 1400 |
| B | 55 | Al$_2$O$_3$ | 45 | 55 | 1400 |
| C | 35 | Al$_2$O$_3$ | 65 | 40 | 1300 |
| D | 60 | 70% Al$_2$O$_3$-30% TiC | 40 | 55 | 1400 |
| E | 40 | 70% Al$_2$O$_3$-30% TiC | 60 | 55 | 1400 |

Pressed samples were produced from the powder mixture in the same manner as in Example 1. The samples were placed in containers made of Mo and subjected to the same pretreatment as in Example 1. Then, the samples were sintered in an ultrahigh pressure apparatus under the same conditions as in Example 1. The temperature was retained for 20 minutes for all the samples.

Cutting chips were produced in the same manner as in Example 1, respectively. Each chip was welded to one corner of a square chip made of cemented carbide. By way of comparison, a commercial ceramic tool (referred to as W) principally comprising Al$_2$O$_3$ and an Al$_2$O$_3$ ceramic tool (referred to as B) containing TiC were prepared.

Cutting tests were made on FC25 cast iron having a hardness of H$_{RB}$250. The work was formed into a pipe 80 mm in outside diameter, 70 mm in inside diameter and 5 mm in thickness so that the dimensional precision may be examined after cutting. The cutting was effected on the inside diameter part under the conditions of: cutting speed 400 m/min; depth of cut 0.1 mm; feed 0.1 mm/rev. After the cutting the ovality and surface roughness of the inside diameter part were examined, and the results were as shown in Table 2.

TABLE 2

| No. | Surface Roughness Rmax μm | Ovality μm |
|---|---|---|
| A | 5 | 1-2 |
| B | 4 | 1-2 |
| C | 6 | 3-4 |
| D | 4 | 1-2 |
| E | 6 | 3-4 |
| W | 8 | 7-8 |
| B | 7 | 6-7 |

EXAMPLE 3

There were prepared powder mixtures each containing 60 volume % CBN powder having a mean particle size of 7 μm, the residual part comprising the components as shown in Table 3, respectively.

TABLE 3

| No. | Binder Vol % | Pressure Kb | Temperature °C. |
|---|---|---|---|
| F | Al$_2$O$_3$ 35%, Mo 5% | 40 | 1100 |
| G | Al$_2$O$_3$ 38%, TiO$_2$ 2% | 40 | 1200 |

In the same manner as in Example 1, the powder mixtures were pressed into samples, placed in Mo containers, and then sintered under the conditions as shown in Table 3. The sintered compacts thus obtained were polished by means of diamond paste, and each of the sintered compacts showed a compact structure.

EXAMPLE 4

To Al$_2$O$_3$ powder 1 μm in mean particle size was added 2 weight % MgO powder 1 μmin mean particle size. To this powder mixture was further added 65 volume % and 35 volume % CBN powder having a mean particle size of 4 μm respectively to produce sintered compacts 10 mm in outside diameter and 1 mm in thickness in the same manner as in Example 1, except that the sintering pressure was 50 Kb and the temperature was 1300° C. Cutting tools were produced in the same manner as in Example 1 and the cutting properties were compared with those of commercial Al$_2$O$_3$-30% TiC black ceramic. The cutting tests were made on FC20 for 30 minutes under the following conditions: cutting speed 400 m/min; depth of cut 2 mm; feed 0.36 mm/rev. The flank wear width of the black ceramic tool was 0.30 mm, whereas that of the sintered compact according to the invention was 0.21 mm in case of 65% CBN and 0.19 % mm in case of 35% CBN, respectively.

EXAMPLE 5

Carbonitride powder having a composition of $Ti(N_{0.5} C_{0.4})_{0.9}$, $Al_2O_3$ powder, metal Al powder and metal Ti powder were mixed in the ratio of 25%, 70%, 30% and 2% by weight. The powder mixture was pressed, held in a vacuum furnace at 1000° C. for 30 minutes, and then left to cool. The sample thus obtained was pulverized by a ball mill to obtain fine powder having a mean particle size of 0.3 μm, CBN powder 3 μm in mean particle size was mixed with the said powder principally comprising $Al_2O_3$ so that CBN is 60% in volume. The powder mixture was pressed into a compact 10 mm in diameter and 1.5 mm in thickness, and placed in contact with a disk 10 mm in diameter and 3 mm in thickness, and placed in contact with a disk 10 mm in diameter and 3 mm in thickness made of WC-6%Co cemented carbide. The whole was sintered in an ultrahigh pressure apparatus under 45 Kb and 1200° C. for 20 minutes in the same manner as in Example 1. The sintered compact thus obtained consisted of a CBN-containing layer 1 mm in thickness rigidly bonded to the cemented carbide disk. The sintered compact was cut, welded to a substrate of cemented carbide and then polished to produce a cutting chip. A cutting test on FC20 equivalent showed that the flank wear width was 0.15 mm.

EXAMPLE 6

CBN powder 2 μm in mean in particle size and $Al_2O_3$ powder 1 μm in mean particle size were blended in the ratio of 45% to 55% by volume, and fully mixed in a mortar. The powder mixture was plugged into a stainless steel container provided with a bottom 10.0 mm in inside diameter and 14.0 mm in outside diameter, and a WC-15%Co alloy disk 9.9 mm in inside diameter and 3 mm in thickness was placed thereon. Furhter thereon was placed an air permeable pressed body 10.0 mm in outside diameter and 2 mm in thickness formed from −100 mesh to +200 mesh iron powder. The stainless steel tube was plugged, and a pure copper plate was placed thereon. The whole was heated at 1000° C. under a vacuum of $10^{-4}$ torr in a vacuum furnace. After degassing by holding it as it stood for one hour, the temperature was raised to and held at 1100° C. for 10 minutes thereby causing the copper to infiltrate into the pressure iron powder body and maintain the powder material in the airtight state.

The whole was placed in a girdle type ultrahigh pressure apparatus. Pyrophelite was used as a pressure medium, whilst graphite tube as a heater. NaCl was plugged between the sample and the graphite heater. First, the pressure was raised to 55 Kb, and then the temperature was elevated to and held at 1100° C. for 20 minutes. The temperature was lowered and then the pressure was reduced slowly. The sintered compact thus obtained was about 10 mm in outside diameter and about 1 mm in thickness and was rigidly bonded to WC-15%Co cemented carbide. The sintered compact was ground into a plane by a diamond grinder, and then polished by means of diamond paste. An observation under an optical microscope showed that the sintered compact had a perfectly compact structure with $Al_2O_3$ flowing in between the CBN particles. The half width in the diffraction of CuKα ray of $Al_2O_3(116)$ of the sintered compact measured 0.525 deg. An examination by a microvickers hardness tester showed that the sintered compact had a hardness of 3400 as a mean value. The sintered compact was cut by a diamond cutter to produce a cutting chip, and it was welded to a steel substrate.

By way of comparison, a cutting tool of the same configuration was produced from cemented carbide K10 under JIS classification. A cutting test was made on FC20 cast iron having a hardness of $H_{RB}220$ under the following conditions: cutting speed 100 m/min; depth of cut 0.2 mm; feed 0.1 mm/rev. As a result, the surface roughness cut by K10 tool was 15 μm $R_{MAX}$, whilst it was 4 μm $R_{MAX}$ by the sintered compact according to the invention. The surface roughness was only slightly deteriorated to 6 μm $R_{MAX}$ after cutting for 120 minutes. An observation of the edge of the tool after the cutting showed that there was tough adhesive on the rake of K10 tool, whereas no such adhesive was observable in the case of the sintered compact according to the invention.

EXAMPLE 7

CBN powder and $Al_2O_3$ powder were mixed in conformity with the compositions shown in Table 4. The mean particle sixe of $Al_2O_3$ was 1 μm. The powder mixtures were pretreated same as in Example 6, and then sintered in an ultrahigh pressure apparatus under the conditions as shown in Table 4. The heat retaining time was 20 minutes, respectively. Table 5 shows the results of the cutting tests and measurements of the half width by CuKα ray diffraction of $Al_2O_3(116)$.

TABLE 4

|  |  | CBN Vol % | $Al_2O_3$ Vol % | CBN Mean Particle Size μm | Pressure Kb | Temperature °C. |
|---|---|---|---|---|---|---|
| Sintered | A | 55 | 45 | 3 | 55 | 1100 |
| compact | B | 35 | 65 | 2 | 60 | 1200 |
| of | C | 20 | 80 | 3 | 50 | 1300 |
| Invention | D | 80 | 20 | 4 | 55 | 1350 |
| tion | E | 65 | 35 | 5 | 50 | 1200 |
|  | F | 40 | 60 | 3 | 55 | 900 |
|  | G | 35 | 65 | 2 | 60 | 1550 |
|  | H | 40 | 60 | 3 | 60 | 1600 |
|  | I | 50 | 50 | 4 | 60 | 1700 |

Cutting tests were conducted on FC25 cast iron having a hardness of $H_{RB}250$ and formed in the shape of a pipe 150 mm in outside diameter and 70 mm in inside diameter under the following conditions each for 15 minutes: cutting speed 400 m/min; depth of cut 0.1 mm; feed 0.15 mm/rev.

TABLE 5

|  |  | Half Width in CuKα Ray Diffraction of $Al_2O_3$ (116) deg | Flank Wear Width mm | Roughness of Machined Surface Rmax μm |
|---|---|---|---|---|
| Sintered | A | 0.530 | 0.12 | 4 |
| Compact | B | 0.450 | 0.09 | 4 |
| of | C | 0.362 | 0.10 | 5 |
| Invention | D | 0.330 | 0.18 | 6 |
| tion | E | 0.445 | 0.16 | 5 |
|  | F | 0.651 | 0.30 | 6 |
|  | G | 0.178 | 0.25 | 6 |
|  | H | 0.140 | 0.40 | 6 |
|  | I | 0.123 | 0.45 | 7 |
| White Ceramic |  |  | 0.50 | 7 |
| Black Ceramic |  |  | 0.27 | 8 |

By way of comparison, Table 5 includes the results of tests of a commercial ceramic tool (white ceramic) principally comprising $Al_2O_3$ and $Al_2O_3$ ceramic tool (black ceramic) containing TiC. The table shows the superiority of the sintered compacts according to the invention of which the half width of $Al_2O_3(116)$ is within the range from 0.600 deg. to 0.200 deg.

EXAMPLE 8

CBN powder and $Al_2O_3$ powder were mixed in conformity with the compositions as shown in Table 6. The mean particle size of $Al_2O_3$ was 1 μm. The powder mixtures, after the same pretreatment as in Example 6, were sintered in an ultrahigh pressure apparatus under the conditions as shown in Table 6. Observation of the sintered compacts thus obtained showed that $Al_2O_3$ was continuous and the structure was compact. Table 6 also shows the measurements of the half width in the diffraction of CuKα ray of the sintered compacts.

Cutting tools were produced in the same manner as in Example 6 to make cutting tests. The work used heat treated SKD11 steel having a hardness of $H_{RC}63$. The test conditions were as follows: cutting speed 100 m/min; depth of cut 0.1 mm; feed 0.10 mm/rev. By way of comparison, cemented carbide K01 under JIS classification was simultaneously tested. After 10 minutes of cutting, the flank wear width of the sintered compact according to the invention, L, M and N, measured 0.08 mm, 0.1 mm and 0.12 mm, respectively, whilst those of the sintered compact, J and K, measured 0.2 mm and 0.3 mm, respectively. Cemented carbide K01 was unable to cut completely.

TABLE 6

| | | CBN Vol % | $Al_2O_3$ Vol % | CBN Mean Particle Size μm | Pressure Kb | Temperature °C. | Half Width in CuKα Ray Diffraction of $Al_2O_3$ (116) deg |
|---|---|---|---|---|---|---|---|
| | J | 35 | 65 | 30 | 50 | 1200 | 0.440 |
| | K | 10 | 90 | 3 | 55 | 1300 | 0.356 |
| Sintered | L | 80 | 20 | 2 | 60 | 1100 | 0.540 |
| Compact | M | 60 | 40 | 3 | 45 | 1200 | 0.452 |
| of | N | 40 | 60 | 5 | 50 | 1300 | 0.361 |
| Invention | | | | | | | |

EXAMPLE 9

To $Al_2O_3$ powder 1 μm in mean particle size was added 2 weight % MgO powder 1 μm in mean particle size, and then 50 volume % CBN powder 4 μm in mean particle size was added thereto. The powder mixture with 2% camphor added thereto was pressed into a sample 10 mm in outside diameter and 1.5 mm in height. The pressed sample was placed in a container made of Mo, degassed and then sintered in the same manner as in Example 6 to obtain a sintered compact 10 mm in outside diameter and 1 mm in thickness. The sintering was effected under a pressure of 50 Kb and at a temperature of 1300° C. The half width of $Al_2O_3(116)$ measured 0.380 deg.

The sintered compact thus obtained was cut by a diamond cutter to produce a cutting chip. The cutting properties of the chip were compared with those of a commercial cold pressed ceramic tool principally comprising $Al_2O_3$. The tests were made on FC20 under the following conditions: cutting speed 400 m/min; depth of cut 2 mm; feed 0.36 mm/rev; cutting time 30 min. The flank wear width of the commercial ceramic measured 0.30 mm, whereas that of the sintered compact according to the invention measured 0.20 mm.

EXAMPLE 10

To $Al_2O_3$ powder 1 μm in mean particle size was added 10 weight % AlN powder 0.5 μm in mean particle size, and then 45 volume % CBN powder 5 μm in mean particle size was added thereto. The powder mixture was placed in a container made of Mo, degassed, and then sintered under 55 Kb and 1250° C. in the same manner as in Example 6. The half width of $Al_2O_3(116)$ in the sintered compact measured by the diffraction of CuKα ray was 0.400 deg.

The sintered compact thus obtained was cut by a diamond cutter to produce a cutting chip. The cutting chip was tested on FC35 under the following conditions for 15 minutes; cutting speed 300 m/min; depth of cut 1 mm; feed 0.36 mm/rev. By way of comparison, TiC-containing $Al_2O_3$ ceramic was put to the test under the same conditions. As a result, the flank wear width of the commercial ceramic was 0.45 mm, whereas that of the sintered compact according to the invention was 0.19 mm.

What is claimed is:

1. A sintered compact for use in an ultrahard tool consisting essentially of 20-80 volume % cubic boron nitride and the residual part consisting of $Al_2O_3$, said residual part constituting a continuous phase in the structure of the sintered compact, characterized in that the half width of (116) in X-ray diffraction of CuKα ray of the $Al_2O_3$ crystals in the sintered compact is within the range from 0.600 deg. to 0.200 deg., and the particle size of the cubic boron nitride is less than 5 μm.

2. A sintered compact for use in an ultrahard tool as defined in claim 1 characterized in that the ultrahard sintered compact has a thickness in excess of 0.5 mm and is directly bonded to a substrate made of cemented carbide.

3. A sintered compact for use in an ultrahard tool as defined in claim 1 characterized in that the cubic boron nitride accounts for 20-55% by volume.

4. A method for producing a sintered compact for use in an ultrahard tool comprising sintering a powder mixture comprising 20-80 volume % cubic boron nitride powder and the residual part consisting of $Al_2O_3$ powder under a pressure of not lower than 40 Kb and high temperatures ranging from 900° to 1700° C. in an ultrahigh pressure apparatus in which a solid pressure medium is used, said conditions being sufficient to produce a cubic boron nitride powder in which the $Al_2O_3$ forms a continuous phase in the sintered compact and wherein the half width (116) in the X-ray diffraction of the CuKα ray of $Al_2O_3$ crystals in the structure is within the range of from 0.600 deg. to 0.200 deg., and the particle size of the cubic boron nitride is less than 5 μm.

5. A method for producing a sintered compact for use in an ultrahard tool as defined in claim 4 characterized in that the cubic boron nitride is 20-55% by volume.

* * * * *